(12) United States Patent
Miyabukuro

(10) Patent No.: US 6,357,886 B2
(45) Date of Patent: Mar. 19, 2002

(54) REARVIEW MIRROR FOR MOTOR VEHICLES

(75) Inventor: Pedro Takashi Miyabukuro, Santo André-Estado de São Paulo (BR)

(73) Assignee: Metagal Industria e Comercio Ltda., Estado de Sao Paulo (BR)

(*) Notice: Subject to any disclaimer, the term of this patent is extended or adjusted under 35 U.S.C. 154(b) by 0 days.

(21) Appl. No.: 09/768,766

(22) Filed: Jan. 24, 2001

(30) Foreign Application Priority Data

Jan. 28, 2000 (BR) ..................................... MU 8000180

(51) Int. Cl.$^7$ ............................................. G02B 7/182
(52) U.S. Cl. ....................... 359/879; 359/871; 359/872; 359/876
(58) Field of Search ................................ 359/879, 871, 359/872, 876; 248/467, 468, 481, 222.11, 478, 225.11

(56) References Cited

U.S. PATENT DOCUMENTS

| 4,668,059 A | * | 5/1987 | Ohyama | 350/632 |
| 5,151,828 A | * | 9/1992 | Sugimura | 359/871 |
| 5,330,149 A | * | 7/1994 | Haan et al. | 248/549 |
| 6,042,076 A | * | 3/2000 | Moreno | 248/467 |
| 6,202,976 B1 | * | 3/2001 | Johnson et al. | 248/476 |

* cited by examiner

Primary Examiner—Mohammad Sikder
(74) Attorney, Agent, or Firm—Michael J. Striker

(57) ABSTRACT

An internal rearview mirror has a mirror assembly, and an assembling device for connecting the mirror assembly to a windshield, the assembling device including a first base connected with the mirror assembly provided with a fixation device, and a second base fixable to the windshield and formed so that the first base being detachably connectable to the second base, the first base having a superior face adapted to be adjacent to the windshield and provided with a resilient pawl with a projection, and the second base having a posterior edge, formed so that when the first base is forced onto the second base the pawl with the first projection first resilient deflect and thereafter the projection engages behind a posterior edge of the second base so as to retain the bases assembled with one another.

6 Claims, 2 Drawing Sheets

REARVIEW MIRROR FOR MOTOR VEHICLES

BACKGROUND OF THE INVENTION

The present invention relates to a rearview mirror for motor vehicles.

Internal rearview mirrors are known and widely utilized. An internal rearview mirror conventionally includes a mirror, a housing in which the mirror is located and fixed to a mirror plate, an anti-obfuscation mechanism activatable by a lever and displacing the mirror between two positions relative to a support arm or an assembling device. The internal rearview mirror further has the support arm with an inferior end articulately connected to the housing, and the assembling device in which the superior end of the support arm is placed in an articulated way or which is incorporated in the superior end of the support arm. Furthermore, a base is placed on the windshield, usually by glueing and the assembling device is fixed in the base by forcing these elements into one another.

The assembling device usually includes a body composed of thermoplastic material, metal or the like, with a part of the articulation that receives another part of the articulation of the support arm. The body also has guides for forcing these elements into one another. The assembling device also includes an elastic device assembled in the body for fixing the body to the fixed base on the windshield. Optionally, it can also have guides for forcing the elements into one another. In another embodiment, the assembling device is directly incorporated in the superior end of the support arm. In this case, it includes the above mentioned superior end of the support arm, and the elastic device interacting with the fixed base on windshield.

In the conventional construction, the elastic device usually includes an elastic spring of an adequate configuration. It fits under pressure in the base fixed to the windshield and originally is isolated from the body of the assembling device, or from the superior end of the support arm. It is fixed in the body or the end by the insertion with interengagement, or by bolts, screws and the like. In another embodiment, the elastic device can include a seat provided in the superior end of the support arm, a spring inside the seat, and a sphere lodged inside the seat against the spring and having a sector which projects to the outside of the seat and is connected in the recess of the base fixed on the windshield.

The assembling devices of the conventional rearview mirrors are always composed from materials of different elements that are originally isolated and then are assembled with one another. This results in relatively complex production process. Also, another disadvantage is that the different materials act in different ways depending on conditions, such as trepidation, temperature and the like and also different reactions in the course of their service life. This can impair the adequate functioning of the set.

SUMMARY OF THE INVENTION

Accordingly, it is an object of present invention to provide a rearview mirror for a motor vehicle, which avoids the disadvantages of the prior art.

In keeping with these objects and with others which will become apparent hereinafter, one feature of present invention resides, briefly stated, in a rearview mirror which has a mirror assembly; and an assembling device for connecting said mirror assembly to a windshield, said assembling device including a first base connected with said mirror assembly provided with a fixation device, and a second base fixable to the windshield and formed so that said first base being detachably connectable to said second base, said first base having a superior face adapted to be adjacent to the windshield and provided with a resilient pawl with a projection, and said second base having a posterior edge, formed so that when said first base is forced onto said second base said pawl with said first projection first resilient deflect and thereafter said projection engages behind a posterior edge of said second base so as to retain said bases assembled with one another.

When the rearview mirror is designed in accordance with the present invention, its assembling device has a simplified structure and it is produced in a simpler manner than in the prior art.

The assembling device has an efficient functioning during the entire service life. Also, the cost of the internal rearview mirror in accordance with the present invention is lower than the cost of the conventional rearview mirrors.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
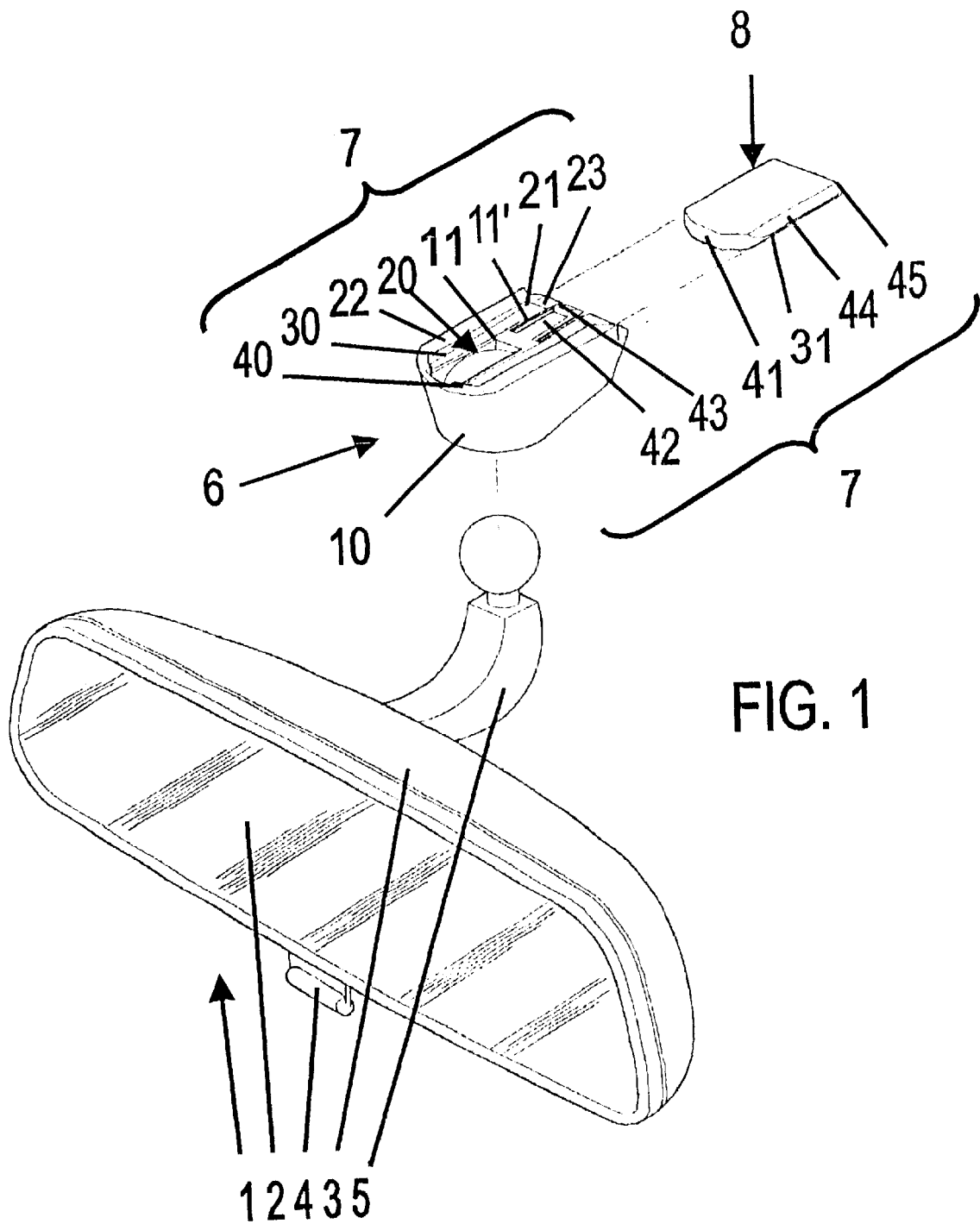
FIG. 1 is a view showing an internal rearview mirror with an assembling device in accordance with the present invention on an exploded view.
Figure 2:
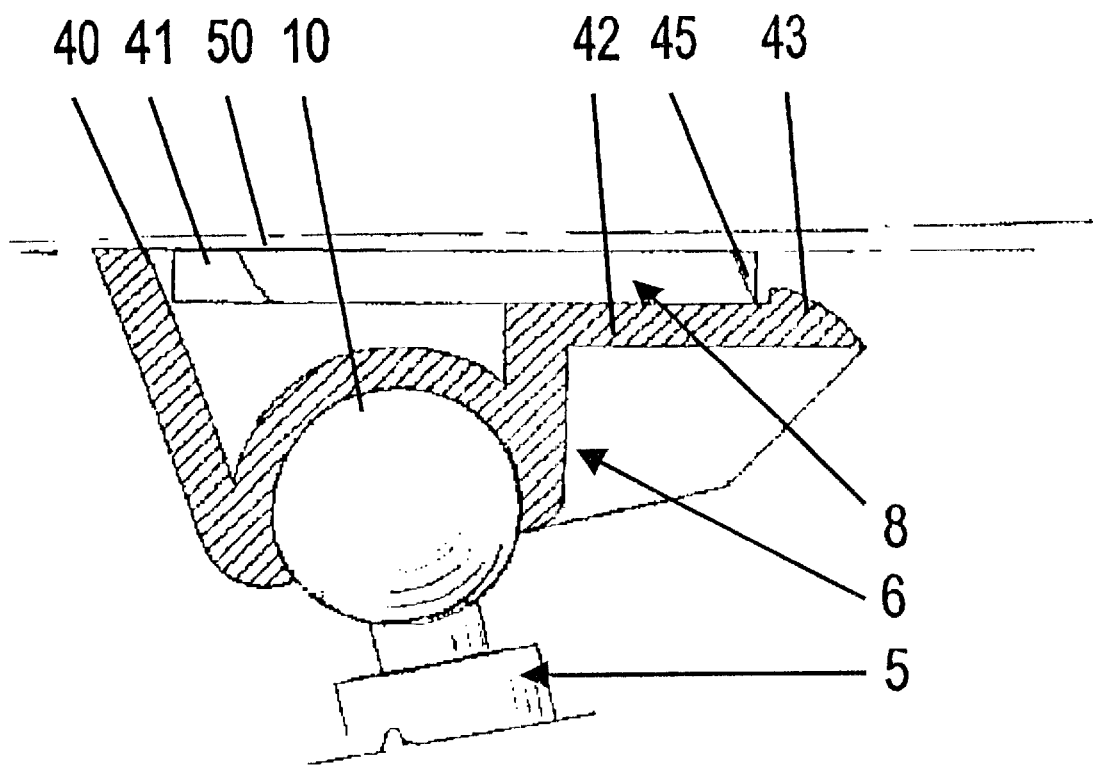
FIG. 2 is a side sectional view of the assembling device of the internal rearview mirror in accordance with the present invention.

An internal rearview mirror in accordance with the present invention is to be assembled on a windshield 50 of a motor vehicle. It includes a mirror assembly which is identified as a whole with reference numeral 1. The mirror assembly includes a mirror element or plate identified with reference numeral 2, a housing 3 in which the mirror plate 2 is internally fixed. It further has an anti-obfuscation device which is activated by a lever 4, so that the mirror can assume two positions with respect to a support arm 5. The support arm 5 has an inferior end which is mounted in an articulated way on the housing.

The interior rearview mirror in accordance with the present invention further has an assembling device which includes a first base 6 mounted in an articulated way to the superior end of the support arm 5, a second base 8, and a fixation device 7 which fixes the first base 6 to the second base 8. The second base 8 has substantially the shape of a small plate which is fixed to the windshield 5 and receives the first base 6.

In a shown embodiment the first base 6 and the fixation device 7 are formed as a one-piece integral part, which can be composed of a thermoplastic material and produced by injection molding, or of metal and the like. It can be obtained simultaneously in the same molding operation.

The first base 6 has any adequate configuration. It has a part 10 of the articulation with the support arm 5. The part 10 has a superior face 11 adapted to be located adjacent to the windshield 5, and a rear superior face 11' having a small thickness which projects to the back of the part 10. The elements 11 and 11' are parts of the fixation device 7.

The fixation device 7 includes a lodging 20 with a posterior opening 21 located on the superior side 11, 11'. It is formed to tightly receive the second base 8. The lodging is defined by the elements 11, 11', and a peripheral wall 22 which extends upwardly and defines a posterior opening 21. The free edge of the elements 11, 11' located at the level of the opening 21 has a chamfer 23 for coupling of the second base 8.

The fixation device 7 also includes means for hanging the first base 6 in the second base 8. This means include guides 30 with a section having a swallow-tail shape or the like, formed internally in the lateral portions of the peripheral wall 22. Chamfers 31 which are formed in the lateral edges of the second base 8 fixed to the windshield 50 are engageable in the guides 30, when the chamfers 31 are introduced into the opening 21 of the first base 6.

The fixation device 7 further has elastic retention clips which are provided on the first base 6 and the second base 8. The retention clips include shoulder lugs provided on an anterior chamfer edge 41 of the second base 8 and cooperating with the anterior part of the peripheral wall 22. They also include a resilient pawl 42 defined between two parallel cuts made in the superior side 11', and a cuneiform projection 43 which projects from the free end of the pawl and cooperates with the anterior chamfer edge 41 and an inferior surface 44 of the second base 8. The elastic clips for retension of the second base 8 include a posterior edge 45 which is formed to cooperate with the projection 43 in the first base 6.

In order to assemble the internal rearview mirror on the windshield 5, the opening 21 of the first base 6 is fitted onto the anterior edge 41 of the second base 8, so that the lateral guides 30 of the first base 6 are fitted on the chamfer edges 31 of the second base 8. The projection 43 of the first base 6 pushes the anterior chamfer edge 41 of the second base 8, the pawl 42 bends downwardly, the lateral guides 30 slide along the chamfer edges 31, the shoulders 40 cooperate with the edge 41, the projection 43 goes beyond the posterior edge 45 of the second base 8, the pawl 42 because of its elastic property returns to its normal position, and the projection 43 is engaged with the posterior edge 45 of the second base 8 so as to retain the set in the assembled condition.

The assembling device of the above described rearview mirror has numerous advantages. First of all, it forms as a single part, which makes it easier for a production process. It is composed of one material and behaves in a uniform way in corresponding conditions, thus avoiding defects during its service life. It is very easy to be disassembled from the windshield, by simply compressing the projection 43 downwardly and releasing the first base 6 from the second base 8. It is also less expensive because of a simple construction.

It is believed to be clear that some modifications of the inventive internal rearview mirror are possible. The first base 6 can be connected to the superior end of the support arm 5 without articulation between the base and the arm. The part of the articulation 10 in the first base 10 can be formed as a seat which receives a sphere at the end of the support arm 5. Alternatively, the articulation 10 of the first base 6 may be sphere which is coupled to the seat of the arm end. The second base 8 can be fixed to the windshield 50 preferably by glueing.

It will be understood that each of the elements described above, or two or more together, may also find a useful application in other types of constructions differing from the types described above.

While the invention has been illustrated and described as embodied in rearview mirror for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An internal rearview mirror, comprising a mirror assembly; and an assembling device for connecting said mirror assembly to a windshield, said assembling device including a first base connected with said mirror assembly provided with a fixation device, and a second base fixable to the windshield and formed so that said first base being detachably connectable to said second base, said first base having a superior face adapted to be adjacent to the windshield and provided with a resilient pawl with a projection, and said second base having a posterior edge, formed so that when said first base is forced onto said second base said pawl with said first projection first resilient deflect and thereafter said projection engages behind a posterior edge of said second base so as to retain said bases assembled with one another, said first base having a lodging with a posterior opening for receiving said second base, said first base having a superior side and a protecting peripheral wall which forms said lodging.

2. An internal rearview mirror as defined in claim 1, wherein said first base and said fixation device are formed as a one-piece integral element.

3. An internal rearview mirror as defined in claim 1, wherein said mirror assembly has a support arm, said first base having a part which is connected with said support arm in an articulated manner.

4. An internal rearview mirror as defined in claim 1, wherein a peripheral wall of said first base is provided with guides, said second base being provided with lateral chamfers which are guided by said guides.

5. An internal rearview mirror as defined in claim 1; and further comprising elastic clips including shoulders provided in a peripheral wall of said first base and chamfer edges provided in said second base and cooperating with said shoulders.

6. An internal rearview mirror as defined in claim 1, wherein said projection of said wall is a cuneiform projection.

* * * * *